United States Patent Office 3,350,588
Patented Oct. 31, 1967

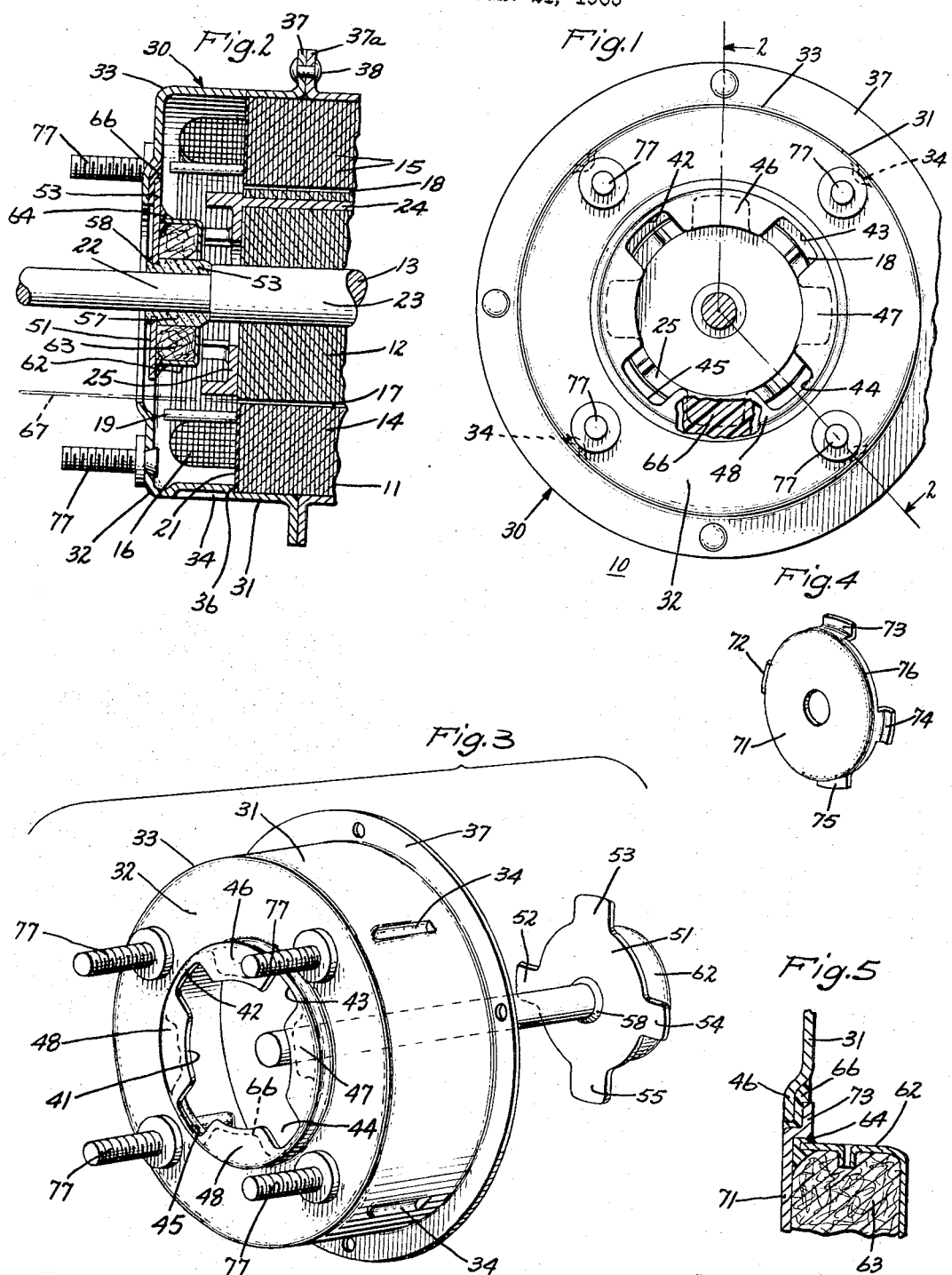

3,350,588
DYNAMOELECTRIC MACHINE ROTOR SUPPORTING STRUCTURE
William A. Rutledge and Jack J. Clarkson, Fort Wayne, Ind., assignors to General Electric Company, a corporation of New York
Filed Jan. 21, 1965, Ser. No. 426,854
4 Claims. (Cl. 310—90)

The present invention relates generally to dynamoelectric machine constructions and more particularly to an improved yet economical and sturdy structure for supporting a rotor and shaft for relative rotation with respect to a stator of a dynamoelectric machine.

In the mass production manufacture of certain dynamoelectric machines, such as small and fractional horsepower electric motors, it has become customary, primarily for reasons of economy and simplicity in design, to build the motors with at least one end frame constructed of relatively thin sheet material, such as steel. The end frame may include an arrangement like spaced apart bolts projecting axially outward from the frame for mounting the motor onto a stationary supporting structure. In addition, the end frame normally supports suitable bearings for rotatably supporting a rotor assembly of the motor. In some cases, these bearings act as thrust receivers for the axial thrust of the rotor assembly. It is extremely desirable that economy in the manufacture of motors incorporating end frames formed of sheet material be maintained while, at the same time, a sturdy end frame structure be provided so that unusually high stresses will not be transmitted to the bearing support from the mounting bolts or axial thrust of the rotor assembly and thereby adversely affecting the bearing mount. These ends are especially difficult to achieve where the bearing is of the sleeve type and it is mounted at one end to the sheet end frame by a staked construction.

It is also desirable that the motors be provided with accurate rotational alignment between cooperating bearing and rotor assembly components as well as a dimensionally controlled air gap between the rotatable and stationary assemblies in the motors. By way of illustration, with motors having sleeve type bearings, the axis of the internal journal surfaces for the respective bearings should be approximately co-axial with each other as well as with the rotational axis of the shaft. The slightest variation in these relationships produces a cocking of the shaft and bearings relative to one another which, in turn, tends to cause interference with shaft rotation and a resulting reduction in motor efficiency and longevity of operation.

With respect to the dimensionally controlled air gap, it is important in certain types of motor constructions that the air gap between the rotor and stator assemblies be generally uniform in a radial direction for the axial length of the members to furnish a desirable magnetic field pattern across the air gap, among other reasons well known to those skilled in the art.

It is, therefore, highly desirable that an improved yet economical dynamoelectric machine incorporating at least one sheet end frame be provided which has a sturdy structure for rotatably supporting the machine rotor assembly and is sufficiently strong to receive axial thrusts of the rotor assembly and mounting stresses without adversely affecting the support of the bearing carried by the end frame. Moreover, the structure should permit the inexpensive attainment of accurate rotational alignment between the bearing and shaft components and a controlled air gap between the rotatable and stationary assemblies consistently on a mass production basis from one machine to another.

It is therefore a primary object of the present invention to provide an improved yet economical dynamoelectric machine construction for supporting the rotatable and stationary assemblies for relative rotation. It is another object of the invention to provide an improved electric motor having at least one end frame formed of sheet material with the desirable features mentioned heretofore.

It is another object of the present invention to provide an improved arrangement for supporting the rotatable assembly of an electric motor which is economical to produce, facilitates the efficient manufacture of the motor, and provides a simple yet sturdy support for the rotatable assembly.

In carrying out the objects in one form thereof, we provide an improved electric motor construction having at least one end frame fabricated from sheet material and mounting a bearing for rotatably supporting the shaft of the motor. The end frame includes a first member which is mounted adjacent one side of the stator of the motor and has a wall formed with a generally circular aperture at the motor axis. A number of angularly spaced apart openings extend radially outward from the aperture in alignment with the air gap of the motor to define at least two depending solid sections between adjacent openings. The end frame also includes a second sheet member which mounts a bearing for rotatably supporting the motor shaft. This latter member is formed with outwardly extending sections which are attached to the inner side of the depending solid sections by hardened epoxy resin. In the construction having a sleeve type bearing and a lubricant reservoir, the reservoir is carried by the second member radially inward of the openings.

This arrangement provides an unobstructed opening to the air gap which is sufficiently large to permit access to the air gap for the removal of shim means or the like during assembly of the motor components. In addition, the construction of the end frame is extremely sturdy, even though the supporting members are formed of relatively thin sheet material and furnish an end frame which is capable of receiving the axial thrust of the motor without detrimentally affecting the mounting of the bearing. Moreover, where the first member of the frame also supports bolts or the like to mount the motor to a stationary structure, the rigidity of the frame construction prevents the transmission of stresses having a magnitude which might adversely affect the bearing mounting. This construction is economical to produce, facilitates the efficient manufacture of the motor as well as allows accurate alignment of the bearings and shaft during assembly of the component parts and provides a simple yet sturdy support for the rotatable support for the motor shaft.

The subject matter which we regard as our invention is particularly pointed out and distinctly claimed in the concluding portion of this specification. Our invention, itself, however, both as to its organization and method of operation, together with further objects and advantages thereof may best be understood by reference to the following description taken in connection with the accompanying drawing.

In the drawing:

FIGURE 1 is an end view, partially broken away, of a small electric motor incorporating the preferred form of our invention;

FIGURE 2 is a sectional view taken along line 2—2 in FIGURE 1 showing one side including the shaft supporting end frame of the motor seen in FIGURE 1;

FIGURE 3 is an exploded view in perspective of the end frame shown in FIGURES 1 and 2;

FIGURE 4 is a view in perspective of a variation of the central bearing supporting sheet member of the end frame shown in the previous figures; and FIGURE 5 is a partial view in cross-section of the plate of FIGURE 4 finally assembled in the motor of FIGURE 1.

Referring now to the drawing in more detail, and in particular to FIGURES 1–3, one form of our invention is illustrated as being incorporated in a fractional horsepower, induction motor 10 having a stator 11 of suitable construction and a rotatable assembly, including a conventional squirrel cage induction rotor 12 secured to rotate with shaft 13. By way of exemplification, the illustrated stator 11, partially seen in FIGURE 1, is made in accordance with the disclosure of United States Patent 3,130,528, granted Apr. 17, 1962, to M. V. De Jean, which is assigned to the same assignee as the present invention. The stator has a laminated core 14 with a circular outer configuration formed of a preselected number of laminations 15 stamped from suitable magnetic material, such as 0.060 inch steel. The laminations are secured together in stacked relation to form a plurality of angularly spaced apart salient pole sections and slots (not shown) which project entirely through the stack for accommodating the sides of winding coils 16 wound with turns of magnet wire. The radially innermost edges 17 of the pole sections define an annular rotor receiving bore 18 in communication with the slots. Winding pins 19 are employed to retain the end turns of the coils away from the bore and, with a layer of adhesive type electrical insulating material 21; e.g., thermo-responsive epoxy resin, applied to the walls of the slots and side faces of the core, hold the laminations together in a firm and rigid relation.

With respect to the details of the rotatable assembly of the exemplification, shaft 13 is furnished with a pair of axially spaced apart, highly finished, annular journal surfaces 22 in the usual way, each having a center of generation located substantially at the rotational axis of the shaft. Only one of these surfaces is shown in FIGURE 1. Mounted on an enlarged section 23 of the shaft, intermediate the journal surfaces, is the rotor 12, which is of standard design, having a laminated secondary core of magnetic material provided with a longitudinal outer surface accurately finished or machined into a cylindrical configuration within preselected tolerances. This outer surface of the rotor core, like the journals of the shaft, has the axis of the shaft as the center of generation. The rotor core carries a cast squirrel cage winding defined in the usual fashion by a plurality of angularly spaced apart conductors 24, projecting entirely through the core in an axial direction, and a short circuiting ring 25 at each end of the core for joining the conductors together. The squirrel cage winding may be cast of any suitable non-magnetic material, such as aluminum, with the end rings carrying a number of impeller blades 26 for the customary motor cooling function.

The sturdy yet economical shaft supporting structure made in accordance with one form of the invention is illustrated in detail in FIGURES 1–3 inclusive. For reasons of simplicity and brevity, only one end frame assembly, generally denoted by numeral 30, has been shown in these figures, but it is understood that the end frame assembly at the other side of the motor (not shown in full) may be of similar construction. More specifically, end frame assembly 30 has a generally cup-shaped outer member 31 fabricated from relatively thin sheet material, such as steel, and provided with an axially projecting wall section in partially overlapping or telescoping complementary relation with the longitudinal periphery of stator core 14. This axial section also surrounds the winding end turns and is integrally joined to a somewhat radial wall section 32 by an annular, curved portion 33 to furnish, among other things, a cavity for housing the winding end turns.

A number of angularly spaced axial positioning depressions 34 are pressed into the axial section of member 31 to form inwardly disposed projections which engage the associated side face of the stator, adjacent its edge 36, and accurately position wall section 32 relative to the stator. Any suitable means may be employed to secure the cup-shaped member 31 and the stator fixedly together in assembled relation. In the illustrated exemplification, this is accomplished by terminating the edge of section 31 disposed away from section 32 in an upstanding flange 37 near the axial center of the stator. A number of rivets 38 are employed to secure upstanding flange 37 to its counterpart 37a of the end frame assembly located at the other end of the motor, partially illustrated in FIGURE 2.

Turning now to a consideration of the details of the end frame assembly in the exemplification, a generally circular aperture 41 is provided centrally of section 32, having its center of generation approximately at the rotational axis of the motor. A number of angularly and equally spaced apart openings 42, 43, 44, and 45 extend radially outward from aperture 41 to a location slightly beyond air gap 18 and define a corresponding number of depending sections or portions 46–49 inclusive between adjacent openings. By one of the features of the present invention, it is possible to fabricate the outer member 31 into the desired configuration by a standard type, low cost and simple stamping operation and then utilize the sheet material, cut out of wall section 32 to form aperture 41 and the associated openings, as the means for mounting the shaft supporting bearing and its lubrication system. The cut out sheet member is designated by numeral 51 in the first three figures and originally has an outer contour conforming to the configuration defined by aperture 41 and associated openings 42–45 inclusive. Accordingly, it includes four equally and angularly spaced apart outwardly extending portions 52–55 respectively severed from the four openings of the first sheet member.

As illustrated, a bearing 57 of the sleeve type is mounted to the second sheet member 51 by initially forming one end of the bearing with a dimensionally reduced outer diameter, projecting the reduced end of the bearing through a central hole in member 51, and then staking it at one end 58 to the outside surface of member 51. The inner end 59 of the bearing is formed with a radial, stationary thrust receiving surface for receiving the axial thrust of shaft 13 through enlarged shaft section 23 as shown in FIGURE 2. With respect to the lubrication system of the exemplification, it is provided in accordance with the disclosure of U.S. Patent 3,008,777, granted to Lawrence W. Wightman on Nov. 14, 1961. A cup-shaped element 62, stamped from suitable sheet material such as steel, surrounds the outer longitudinal surface of the bearing to enclose a ring of lubrication retaining means, such as an oil impregnated felt pad 63, and, at the same time, supports the inner end 59 of the bearing. The outer edge of element 62 is secured to the inner surface of member 51 by an adhesive type bonding material 64, such as cured thermosetting epoxy resin having a polyamide hardener of curing agent. Preferably, the outer diameter of element 62 is dimensionally less than the diameter of aperture 41 so that element 62 may be readily secured around its entire circumference to member 51. With the bearing being preferably formed of porous sintered material, lubrication may be supplied from the reservoir and fed to the bearing bore at a predetermined rate through the body of the porous bearing in the manner well known in the art.

It is convenient to assemble the component parts of the bearing and its lubrication system onto member 51 to provide, in effect, a subassembly shown in FIGURE 3, and then secure the subassembly in its proper position, now to be described, onto sheet member 31 of the end frame assembly.

Preferably, outwardly extending portions 52–55 of member 31 are joined to depending portions 46–49 by hardened, adhesive type, bonding material 66 which may be of the same composition as bonding material 64. In particular, material 66 in its unhardened state may be applied to the surface adapted to face the interior of the motor of each depending portion and thereafter portions 52–55 of member 51 may be pressed onto the material to assume the positions seen in FIGURES 1 and 2. Preferably, the angular width of the depending portions of wall 32 should be greater than that for the extended portions of member 51 to provide an adequate seat for the extended portions. Additionally, by fabricating members 31 and 51 with quadrature symmetry, the members may be assembled without the need for matching given depending and extending portions. It will be recognized by those skilled in the art that in mass production manufacture, member 51 need not be the identical material cut from the center of member 31 to which it is being attached, but, rather, may be one severed from another member 31 produced by the same stumping operation. Primarily, for assisting in retaining the unhardened material and in centering member 51 relative to member 31, the central portion of wall 32 of member 31 may be axially off-set from its remainder, slightly beyond openings 42–45.

It should be noted at this time that during the manufacture of motor 10, air gap 18 may initially be established with the desired uniformity by a number of spaced apart steel shims or the like, indicated at 67 in FIGURE 2, which project axially away from the air gap. Member 31 may then be secured to stator 11, with the shims extending beyond the confines of the member through at least two of openings 42–45 located in axial alignment with the air gap. The angular width of the openings should be sufficiently large to permit the subsequent removal of the shims from the motor to release the rotor and stator for relative rotation. In addition, member 51 and the parts it carries should not interfere with or obstruct the openings for this reason. When member 31 and the stator are being assembled, it is convenient to have member 31 of FIGURES 1–3 already in place on member 51 and material 66 still in its unhardened state. The motor components are then in their final assembled relation and the shaft 13 will act to properly align the bearings in the manner disclosed in U.S. Patent No. 3,165,816, Thompson et al., granted Jan. 19, 1965. Finally, material 66 is caused to be hardened or cured and the shims removed through the openings from the air gap to release the rotor for relative rotation.

By forming the second sheet member which mounts the bearing and lubrication system into the shape revealed in FIGURES 4 and 5 and identified by numeral 71, it is practical to secure member 31 and the stator 11 together first and then assemble member 71 and the components it carries onto member 31. More specifically, member 71, like member 51, is severed from member 31 by a stamping operation and, therefore, originally has an outer configuration substantially corresponding to the contour defined by aperture 41 and the four openings in wall 32 of member 31. During the stamping operation, the four outwardly extending portions 72–75 are bent axially toward the surface of the member 71 adapted to mount the lubricant reservoir and radially outward. Moreover, an axial flange 76 is formed between each pair of extending portions. Thus, the overall radial dimensions of member 71 are less than those for member 51 of FIGURES 1–3 inclusive and permit member 71 to pass easily through member 31.

In particular, it is relatively simple to slide member 71 and the associated components as a subassembly along shaft 13, through aperture 41 and the four openings of member 31, and then turn member 71 such that the extended portions are seated in unhardened material 66 disposed on the inner surfaces of the depending portions of member 31. Flanges 76 of member 71 also serve to overlap the edge of element 62 of the reservoir and to confine material 64 in an annular bead, insuring a sealed fit between the parts. The assembly of motor 10 using member 71 may be completed as described above in connection with member 51.

It will be appreciated that in the motor of the exemplification, the end shield assembly 30 is unusually sturdy in spite of the relatively thin sheet material for members 31, 51. Further, with member 51 or 71 mounted to the inner surface of wall 32 of member 31, a strong union is provided, capable of withstanding high axial thrusts for the rotor since, among other things, the thrust places the securement of the members under compressive rather than tensive forces. Openings 42–45 in wall 32 not only may be utilized during assembly of the motor, but also permit the ingress and egress of coolant, such as air, into the motor interior for ventilation purposes during subsequent operation of the motor. When mounting bolts 77 are fastened to the end frame assembly 30 for mounting the motor onto a stationary structure, it is possible to employ the openings in member 31 for reducing the transmission of mounting stresses to the bearing. This is accomplished by attaching a bolt to wall 32 of member 31, outwardly of each opening adjacent curved portion 33. The openings achieve this stress transmission reduction without adversely affecting the sturdy construction of the assembly.

Consequently, the present invention provides an inexpensive, yet sturdy, end frame construction for rotatably supporting the rotor and shaft, capable of receiving end thrusts of the shaft. It also permits the attainment of accurate alignment of bearing and shaft components and of a uniform air gap. The efficient and economical manufacture of dynamoelectric machines incorporating our invention is also a benefit of our invention.

While we have shown and described preferred embodiments of the invention, it will be obvious to those skilled in the art that changes and modifications may be made without departing from the invention. By way of illustration, the exact contour and size of aperture 41 and its associated openings may take an escalloped form other than that illustrated, with aperture 41 being sufficiently large to permit insertion of the rotor and shaft assembly into the stator bore after member 31 has been secured in place. It is therefore intended in the appended claims to cover all such changes and modifications that fall within the true spirit and scope of our invention.

What we claim as new and desire to secure by Letters Patent of the United States is:

1. A dynamoelectric machine comprising a stationary assembly including a stator, a shaft, a rotor rotatably carried by said shaft in spaced relation to said stator forming an air gap therewith, an end frame including a first member formed of sheet material mounted adjacent at least one side of said stator, said member having a wall formed with a generally circular aperture at the axis of the machine, and a number of angularly spaced apart openings extended radially outward from the aperture in axial alignment with said air gap, to define at least two depending solid sections therebetween; a second sheet member mounting a bearing for rotatably supporting the shaft and formed with at least two outwardly extending sections, means attaching said depending and extending sections together with said openings in said first member being unobstructed by said second member and being sufficiently large to permit access to the air gap for removing shim means therefrom during assembly of the machine components.

2. A dynamoelectric machine comprising a stationary assembly including a stator, a shaft, a first member formed of sheet material attached to said stationary assembly, and having a wall formed with an aperture at the axis of the machine, said wall including a number of angularly spaced apart solid sections projecting into said aperture, a second member formed of sheet material mounting a bearing for supporting the shaft, said second member including a number of outwardly extending sections secured to said solid sections of said first member to provide a sturdy structure for carrying the bearing in alignment with the shaft.

3. The dynamoelectric machine of claim 2 in which the contour of said aperture in said first member approximates the original outer peripheral configuration of said second member to allow the second member to be cut out from the first member.

4. A dynamoelectric machine comprising a stationary assembly including a stator; a shaft; a rotor rotatably carried by said shaft in spaced relation to said stator forming an air gap therewith; and at least one end frame including a first member formed of sheet material mounted adjacent one side of said stator, said member having a wall formed with a generally circular aperture at the axis of the machine, and a number of angularly spaced apart openings extended radially outward from the aperture in axial alignment with said air gap to define a number of depending solid portions therebetween; a second sheet member mounting a sleeve type bearing for rotatably supporting the shaft and mounting a lubricant reservoir in communication with said bearing for retaining and feeding lubricant to the journal thereof; said second member formed with a number of outwardly extending portions, means attaching said extending portions to the inner surfaces of said depending portions, with said openings in said first member being unobstructed by said second member and said lubricant reservoir, said openings being sufficiently large to permit access to the air gap for removing shim means therefrom during assembly of the machine components.

References Cited

UNITED STATES PATENTS 3,320,660   5/1967   Otto ---------------- 310—90

MILTON O. HIRSHFIELD, *Primary Examiner.*

L. L. SMITH, *Assistant Examiner.*